United States Patent [19]
Wilkey

[11] Patent Number: 5,266,635
[45] Date of Patent: Nov. 30, 1993

[54] IMPACT RESISTANT POLYCARBONATES CONTAINING ELASTOMERS HAVING PHENOLIC GROUPS

[75] Inventor: John D. Wilkey, Houston, Tex.

[73] Assignee: Shell Oil Company, Houston, Tex.

[21] Appl. No.: 23,308

[22] Filed: Feb. 26, 1993

[51] Int. Cl.$^5$ .............. C08L 69/00; C08L 53/02; C08F 287/00
[52] U.S. Cl. ..................... 525/67; 525/92; 525/298
[58] Field of Search ............. 525/67, 92, 298

[56] References Cited

U.S. PATENT DOCUMENTS

| | | |
|---|---|---|
| Re. 27,145 | 6/1971 | Jones . |
| 3,431,224 | 3/1969 | Goldblum . |
| 3,573,253 | 3/1971 | Gray . |
| 4,039,593 | 8/1977 | Kamienski et al. . |
| 4,039,630 | 8/1977 | Kanagawa ............... 525/298 |
| 4,129,617 | 12/1978 | Machi et al. . |
| 4,137,137 | 1/1979 | Machi et al. . |
| 4,333,809 | 6/1982 | Schreckenberg et al. . |
| 4,628,072 | 12/1986 | Shiraki et al. . |
| 4,678,843 | 7/1987 | Elmore et al. . |
| 4,689,371 | 8/1987 | Elmore et al. . |
| 4,775,730 | 10/1988 | Gupta . |
| 4,788,263 | 11/1988 | Patterson . |
| 4,822,862 | 4/1989 | Rupp et al. . |
| 4,824,758 | 4/1989 | Gupta et al. . |
| 4,826,890 | 5/1989 | Gupta . |
| 4,826,891 | 5/1989 | Gupta . |
| 4,866,125 | 9/1989 | Lo .......................... 525/92 |
| 4,868,256 | 9/1989 | Aslam et al. . |
| 4,868,257 | 9/1989 | Aslam et al. . |
| 4,898,916 | 2/1990 | Gupta . |
| 4,912,173 | 3/1990 | Keene et al. . |
| 4,929,694 | 5/1990 | Aslam et al. . |
| 4,962,147 | 10/1990 | Vicari . |
| 5,175,212 | 12/1992 | Modic ........................ 525/67 |

FOREIGN PATENT DOCUMENTS

| | | |
|---|---|---|
| 396027A | 4/1989 | European Pat. Off. . |
| 353339 | 2/1990 | European Pat. Off. . |
| 355983 | 2/1990 | European Pat. Off. . |
| 442086 | 2/1990 | European Pat. Off. . |
| 357178 | 3/1990 | European Pat. Off. . |
| 461482 | 6/1990 | European Pat. Off. . |
| 4014308 | 5/1990 | Fed. Rep. of Germany . |
| 2060925A | 8/1988 | Japan . |

OTHER PUBLICATIONS

Evans et al, Polymer Preprints, Am. Chem. Soc. 1991, 32, 176–177.

Primary Examiner—David J. Buttner
Attorney, Agent, or Firm—Keith M. Tackett

[57] ABSTRACT

Hydrogenated styrene/diene block copolymers having grafted p-hydroxystyrene groups improve the low temperature impact strength of polycarbonates when the phenolic groups are reacted with the polycarbonates.

5 Claims, No Drawings

IMPACT RESISTANT POLYCARBONATES CONTAINING ELASTOMERS HAVING PHENOLIC GROUPS

FIELD OF THE INVENTION

This invention relates to polycarbonates having good impact properties, more specifically to polycarbonates that are blended with elastomers containing phenolic groups.

BACKGROUND OF THE INVENTION

Polycarbonates have excellent mechanical properties, but are relatively brittle at low temperatures. U.S. Pat. No. 4,628,072 discloses the use of modified, hydrogenated block copolymers of styrene and conjugated diolefins as impact modifiers for polycarbonates. The block copolymers may be modified with a variety of acid groups or derivatives of the acid groups. The inclusion of acid or derivative functional groups on the block copolymers was generally considered to be necessary for the polycarbonates to have improved paint adhesion.

Addition of phenolic groups to elastomeric polymers and combination of the elastomers with polycarbonates is known in the art. It is an object of the invention to make improved compositions having excellent impact strengths at low temperatures.

SUMMARY OF THE INVENTION

Hydrogenated styrene/diene polymers having grafted phenolic groups significantly improve the impact strength of polycarbonates when the two components are chemically bonded to form a compatible blend.

DETAILED DESCRIPTION OF THE INVENTION

The polycarbonates used in the preparation of blends of this invention preferably have the general formula:

(A)

wherein n is sufficient to provide either an engineering thermoplastic polymer or a cyclic oligomer and X comprises one or more phenylene or substituted phenylene groups which may be separated by a non-aromatic group such as alkylidene, cycloalkylidene, alkylene, cycloalkylene, azo, imino, sulfur, oxygen, sulfoxide, and sulfone. The substituted phenylene groups include alkyl, alkoxyl, halogen, and nitro substituted phenylene.

The preparation of polycarbonates is well known and commercially available polycarbonates are used in the examples. The most preferred polycarbonates have the formula

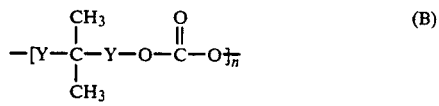
(B)

wherein Y is p-phenylene. The polycarbonates of formula B are prepared by reacting p,p'-isopropylidenediphenol with phosgene and are available from General Electric Company under the trademark LEXAN, from Mobay under the trademark MAKROLON, and from Dow under the trademark CALIBRE. Commercial polycarbonates typically have a number average molecular weight around 18,000 and a melt temperature above 230° C.

Polycarbonates which do not contain aromatic groups generally have lower service temperatures and are not preferred.

The modified block copolymers are produced by free radical grafting of a selectively hydrogenated block copolymer having a specific structure with p-acetoxystyrene. The grafted p-acetoxystyrene moieties are converted to grafted p-hydroxystyrene moieties by aminolysis, hydrolysis, saponification or other processes known to persons skilled in the art. The block copolymers generally have at least two vinyl aromatic blocks and at least one hydrogenated conjugated diene block wherein the vinyl aromatic blocks phase separate into physically crosslinked domains. The hydro-genated conjugated diene blocks have a residual unsaturation less than 10% and a number average molecular weight between 10,000 and 1,000,000. The vinyl aromatic blocks have a number average molecular weight between 500 and 50,000. The block copolymer structure may be linear, radial, or branched.

Anionic polymerization of conjugated diene hydrocarbons with lithium initiators is well known as described in U.S. Pat. Nos. 4,039,593 and Re. 27,145 which descriptions are incorporated herein by reference.

The anionic polymerization of the conjugated diene hydrocarbons is typically controlled with structure modifiers such as diethylether or glyme (1,2-diethoxyethane) to obtain the desired amount of 1,4-addition. As described in Re 27,145 which is incorporated by reference herein, the level of 1,2-addition of a butadiene polymer or copolymer can greatly affect elastomeric properties after hydrogenation.

Dilithium initiation with the diadduct of secbutyllithium (s-BuLi) and m-diisopropenylbenzene also requires presence of a non-reactive coordinating agent such as diethyl ether, glyme, or triethyl amine, otherwise monolithium initiation is achieved. Ether is typically present during anionic polymerization as discussed above, and the amount of ether typically needed to obtain specific polymer structures has been sufficient to provide dilithium initiation.

Anionic polymerization is often terminated by addition of water to remove the lithium as lithium hydroxide (LiOH) or by addition of an alcohol (ROH) to remove the lithium as a lithium alkoxide (LiOR).

The hydrogenated block copolymers contained in the blends of the invention are grafted with p-acetoxystyrene as described below, and further chemically modified to provide grafted p-hydroxystyrene groups. Grafting includes properly admixing and blending predetermined amounts of the hydrogenated block copolymer with p-acetoxystyrene and a free radical initiator. The amount of the free radical initiator used is that which is sufficient to induce the reaction.

The grafted p-acetoxystyrene moieties are converted to grafted p-hydroxystyrene (p-vinylphenol) moieties by any means known in the prior art. For example, hydrolysis, aminolysis and saponification may be utilized as described in U.S. Pat. Nos. 4,898,916, 4,678,843, and 4,689,371, respectively.

The amount of p-hydroxystyrene groups grafted to the hydrogenated block copolymers which is effective for improving impact strength is generally in the range of from about 1-5 wt %, with at least 3 wt % being preferred for achieving excellent impact strength at low temperatures. The modified block copolymers are chemically bonded to the aromatic polycarbonates to produce the inventive blend. The chemical reaction between the blend component polymers is induced by addition of a catalyst during blending. It will be apparent to those skilled in the art that suitable catalytic species, as are disclosed for example in U.S. Pat. No. 4,788,263, include such compounds as lithium tetraphenylborate, sodium tetramethylammonium tetraphenylborate, and tetra-n-butylaluminum tetraphenylborate. Tetramethylammonium tetraphenylborate is particularly preferred.

The polycarbonate blends of the invention are prepared by mixing the modified block copolymer with at least one suitable aromatic polycarbonate and the catalyst. The amount of modified block copolymer used is generally in the range of not less than about 2 wt % to about 10 wt %, with about 5 wt % being preferred. The amount of aromatic polycarbonate present is from about 90-98 wt %, with about 95 wt % being preferred. The catalyst is present in an amount sufficient to induce the reaction. Quantitatively speaking, the amount of catalyst is about 0.1 mol % of carbonate units in the blend.

Formation of the polycarbonate blends by contacting the modified block copolymer with the aromatic polycarbonate and the catalyst should be performed in an apparatus capable of imparting a high level of mixing so as to rapidly contact the reactants. Devices such as an extruder, a Banbury mixer, a sigma blade mixer, and the like are examples of devices capable of imparting high levels of mixing. Extruders are most preferred to ensure rapid and adequate mixing. A twin screw extruder or a single screw extruder may be utilized. The blending should be performed at sufficiently high temperature for sufficient time to allow reaction of the modified block copolymer with the aromatic polycarbonate. Reaction times longer than about one minute at temperatures above about 250° C. are preferred.

DETAILED DESCRIPTION OF PREFERRED EMBODIMENTS

Blends of the polycarbonates and the modified block copolymer exhibit significant improvement in mechanical properties, particularly low Temperature Notched Izod Impact Strength compared with similar blends utilizing unmodified block copolymer as shown by the examples.

EXAMPLE 1

The block copolymer for this example was a selectively hydrogenated styrene-isoprene diblock copolymer having a polystyrene block of about 35,500 peak molecular weight and a hydrogenated polyisoprene block of about 61,500 peak molecular weight. At least 98% of the isoprene units were hydrogenated. An acetone solution of 0.2 wt % Lupersol 101 was added to the copolymer followed by 10.0 wt % p-acetoxystyrene monomer. The mixture was extruded utilizing a corotating twin screw extruder achieving a melt temperature of 270° C. and a residence time of about one minute. Analysis of the product revealed a grafted p-acetoxystyrene content of 4.3 wt %.

The grafted p-acetoxystyrene groups were converted to p-hydroxystyrene groups by solution saponification with dilute aqueous sodium hydroxide followed by neutralization with a sufficient amount of dilute aqueous hydrochloric acid solution to convert phenoxide moieties to hydroxy styrene moieties. The presence of phenoxide moieties was found to substantially reduce impact properties.

Blends of LEXAN 141 polycarbonate (available from G. E. Plastics) with the base block copolymer and the modified block copolymer were prepared and analyzed for improvements in low temperature toughness. The comparative results are given in TABLE 1. All blend components were dried at 160° C. for at least 8 hours prior to all processing steps. Blends were prepared on a Berstorff ZE 25 mm or Werner Pfleiderer 30 mm corotating twin screw extruder. Injection molded test specimens were produced from pelletized extrudate using an Arburg reciprocating screw injection molder. Notched Izod testing (⅛", −40° C.) was conducted according to ASTM D256. In some instances, incompatibility between polycarbonate and the block copolymer results in variations in the Notched Izod values between the gate and dead regions of the molded specimens. When significant variation was observed, the Notched Izod results are reported as Gate Value/Dead Value.

TABLE 1

| Blend Composition | | | | Properties |
|---|---|---|---|---|
| LEXAN 141 (wt %) | Block Copolymer (wt %) | Grafted p-Hydroxystyrene (wt %) | Catalyst (wt %) | ⅛" Notched Izod (−40° C.) (ft-lb/in) |
| 100 | 0 | — | 0 | 2.4 |
| 95 | 5 | 0 | 0 | 5.0/8.9 |
| 95 | 5 | 3.2 | 0.1 | 8.5/10.3 |

LEXAN 141 is bisphenol-A polycarbonate from G.E. Plastics. Catalyst is tetramethylammonium tetraphenylborate.

EXAMPLE 2 (HYPOTHETICAL)

The block copolymer for this example is a selectively hydrogenated styrene-isoprene diblock copolymer having a polystyrene block of about 35,500 peak molecular weight and a hydrogenated polyisoprene block of about 61,500 peak molecular weight. At least 98% of the isoprene units are hydrogenated. An acetone solution of 0.2 wt % Lupersol 101 is added to the copolymer followed by 10.0 wt % p-acetoxystyrene monomer. The mixture is extruded utilizing a corotating twin screw extruder achieving a melt temperature of 270° C. and a residence time of about one minute.

The grafted p-acetoxystyrene groups are converted to p-hydroxystyrene groups in an extruder by injecting ammonia gas into the extruder after the grafting reaction zone. The ammonia is reacted above 200° C. for at least 10 seconds.

Blends of LEXAN 141 polycarbonate with the block copolymer and the modified block copolymer are prepared to demonstrate improvements in low temperature toughness. All blend components are dried at 160° C. for at least 8 hours prior to all processing steps. Blends are prepared on a Berstorff ZE 25 mm or Werner Pfleiderer 30 mm corotating twin screw extruder. Injection molded test specimens are produced from pelletized extrudate using an Arburg reciprocating screw injection molder.

We claim:
1. A polymer composition, comprising:
   a polycarbonate having a number average molecular weight of about 18,000; and about 5% by weight of the composition of a hydrogenated styrene/diene block copolymer having at least 3% by weight of the block copolymer of grafted p-hydroxystyrene groups which have been reacted with the polycarbonate.

2. The polymer composition of claim 1, wherein the hydrogenated block copolymer has the structure styrene-hydrogenated isoprene with peak molecular weights of about 35,500 for the styrene blocks and about 61,500 for the hydrogenated isoprene blocks.

3. The polymer composition of claim 2, wherein the isoprene blocks are at least 98% hydrogenated.

4. The polymer composition of claim 3, wherein the composition contains 5% by weight of the block copolymer.

5. The polymer composition of claim 4, wherein the minimum impact strength of a test sample is at least 8.5 ft-in/in at $-40°$ C. as measured by ASTM Method D256 ($\frac{1}{8}$" Izod).

* * * * *